(12) United States Patent
Manabe et al.

(10) Patent No.: US 10,622,659 B2
(45) Date of Patent: Apr. 14, 2020

(54) WATER TREATMENT SYSTEM USING ALKALINE WATER ELECTROLYSIS DEVICE AND ALKALINE FUEL CELL

(71) Applicant: DE NORA PERMELEC LTD, Fujisawa-shi, Kanagawa (JP)

(72) Inventors: Akiyoshi Manabe, Fujisawa (JP); Fumiya Tsujii, Fujisawa (JP); Akihiro Kato, Fujisawa (JP)

(73) Assignee: DE NORA PERMELEC LTD, Fujisawa-shi, Kanagawa (JP)

( * ) Notice: Subject to any disclaimer, the term of this patent is extended or adjusted under 35 U.S.C. 154(b) by 252 days.

(21) Appl. No.: 15/580,200

(22) PCT Filed: Jun. 16, 2016

(86) PCT No.: PCT/JP2016/067950
§ 371 (c)(1),
(2) Date: Dec. 6, 2017

(87) PCT Pub. No.: WO2016/204233
PCT Pub. Date: Dec. 22, 2016

(65) Prior Publication Data
US 2018/0175425 A1 Jun. 21, 2018

(30) Foreign Application Priority Data
Jun. 17, 2015 (JP) .................. 2015-121872

(51) Int. Cl.
H01M 8/00 (2016.01)
H01M 8/18 (2006.01)
(Continued)

(52) U.S. Cl.
CPC ......... H01M 8/186 (2013.01); C02F 1/46114 (2013.01); C25B 1/10 (2013.01);
(Continued)

(58) Field of Classification Search
CPC ....... C23B 11/0473; C02F 2001/46133; C02F 1/46114; H01M 4/9041; H01M 8/186; Y02E 60/366
See application file for complete search history.

(56) References Cited

U.S. PATENT DOCUMENTS

2004/0247953 A1 12/2004 Dossas et al.
2014/0170511 A1* 6/2014 Tolmachev ............. H01M 8/08 429/418

FOREIGN PATENT DOCUMENTS

CA 1095848 2/1981
CA 2387847 11/2002
(Continued)

OTHER PUBLICATIONS

Chinese Office Action, issued in the corresponding Chinese patent application No. 201680034907.7, dated Oct. 22, 2018, 14 pages (including machine translation).
(Continued)

Primary Examiner — Cynthia H Kelly
Assistant Examiner — Monique M Wills
(74) Attorney, Agent, or Firm — Hamre, Schumann, Mueller & Larson, P.C.

(57) ABSTRACT

Provided is a water treatment system using an alkaline water electrolytic device and an alkaline fuel cell in which for continuing an electrolytic treatment, a hydrogen gas and an oxygen gas required in an alkaline water electrolytic device and an alkaline fuel cell, an amount of water corresponding to raw water lost through the electrolytic treatment, and an electrolytic solution are efficiently circulated and used in a water treatment system to considerably reduce electric power consumption. The water treatment system is a water treatment system using an alkaline water electrolytic device and an alkaline fuel cell in which an alkaline water electrolytic device and an alkaline fuel cell are connected to each
(Continued)

other, the volume of raw water is reduced, an oxygen gas and a hydrogen gas that are generated from the alkaline water electrolytic device are fed to the alkaline fuel cell, the oxygen gas and hydrogen gas are used to generate electric power by the alkaline fuel cell, electric energy and water are collected, and the collected electric energy is fed to the alkaline water electrolytic device as an electric power source thereof.

10 Claims, 3 Drawing Sheets

(51) Int. Cl.
    *H01M 8/0656*     (2016.01)
    *C25B 15/08*     (2006.01)
    *C25B 11/04*     (2006.01)
    *C25B 1/10*     (2006.01)
    *C25B 15/02*     (2006.01)
    *G21F 9/06*     (2006.01)
    *C25B 9/10*     (2006.01)
    *C02F 1/461*     (2006.01)
    *H01M 4/90*     (2006.01)
    *H01M 8/0662*     (2016.01)
    *H01M 8/083*     (2016.01)
    *H01M 4/92*     (2006.01)

(52) U.S. Cl.
    CPC ............ *C25B 9/10* (2013.01); *C25B 11/0447* (2013.01); *C25B 11/0473* (2013.01); *C25B 11/0494* (2013.01); *C25B 15/02* (2013.01); *C25B 15/08* (2013.01); *G21F 9/06* (2013.01); *H01M 4/9016* (2013.01); *H01M 8/0656* (2013.01); *H01M 8/0681* (2013.01); *C02F 2001/46133* (2013.01); *H01M 4/9041* (2013.01); *H01M 4/926* (2013.01); *H01M 8/083* (2013.01); *Y02E 60/366* (2013.01); *Y02E 60/528* (2013.01)

(56) References Cited

FOREIGN PATENT DOCUMENTS

| | | |
|---|---|---|
| CA | 2915763 | 2/2015 |
| CH | 694443 | 1/2005 |
| CN | 1227423 | 9/1999 |
| DE | 19927849 | 12/1999 |
| DE | 102007027720 | 12/2008 |
| EP | 2017372 | 1/2009 |
| JP | 54-050798 | 4/1979 |
| JP | 58-055799 | 4/1983 |
| JP | 09-290260 | 11/1997 |
| JP | 2002-348694 | 12/2002 |
| JP | 2009-158166 | 7/2009 |
| JP | 2012181961 | 9/2012 |
| JP | 2015-029921 | 2/2015 |

OTHER PUBLICATIONS

Office Action issued in the corresponding Japanese patent application No. 2015-121872, dated May 14, 2019 (3 pages) with machine translation taken from Global dossier of EPO, the cited references having been previously submitted with English abstract, and machine full translations being attached.
Office Action issued in the corresponding Russian patent application No. 2017141982/04(072595), dated Jul. 31, 2019 (8 pages) and corresponding English translation (5 pages), the cited reference having been previously submitted with English abstract, and machine full translation being attached.
International Search Report, issued in the corresponding PCT application No. PCT/JP2016/067950, dated Aug. 9, 2016, 5 pages.
Australian Examination Report issued in corresponding Australian Application No. 2016281251 dated Jul. 26, 2018 (6 pages).
Extended European Search Report, issued in the corresponding European patent application No. 16811707.5, dated Dec. 6, 2018, 11 pages.
Second Australian Examination Report, issued in the corresponding Australian patent application No. 2016281251 dated Mar. 12, 2019, 4 pages.
Canadian Office Action, issued in the corresponding Canadian patent application No. 2989151, dated Mar. 26, 2019, 4 pages.
Second Canadian Office Action, issued in the corresponding Canadian patent application No. 2989151, dated Nov. 29, 2019, 4 pages, JP 58-055799 cited in the Office Action being previously submitted.

\* cited by examiner

[Fig. 1]
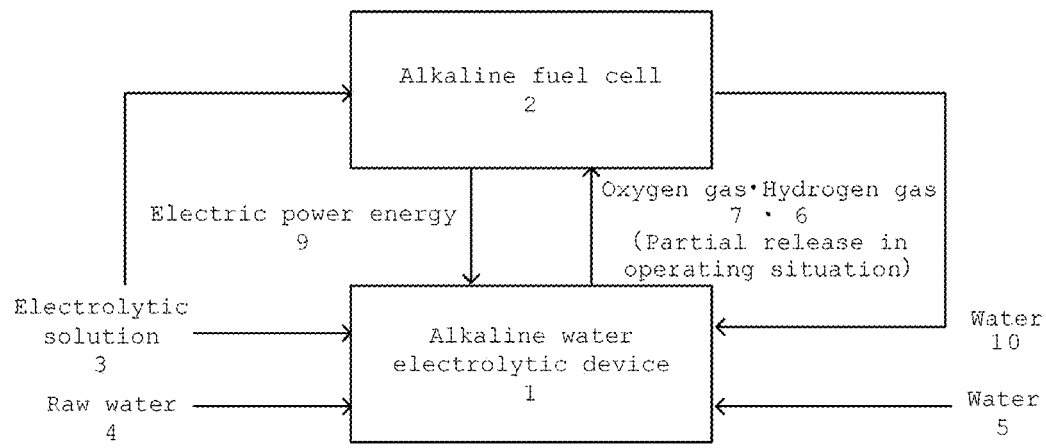
[Fig. 2]
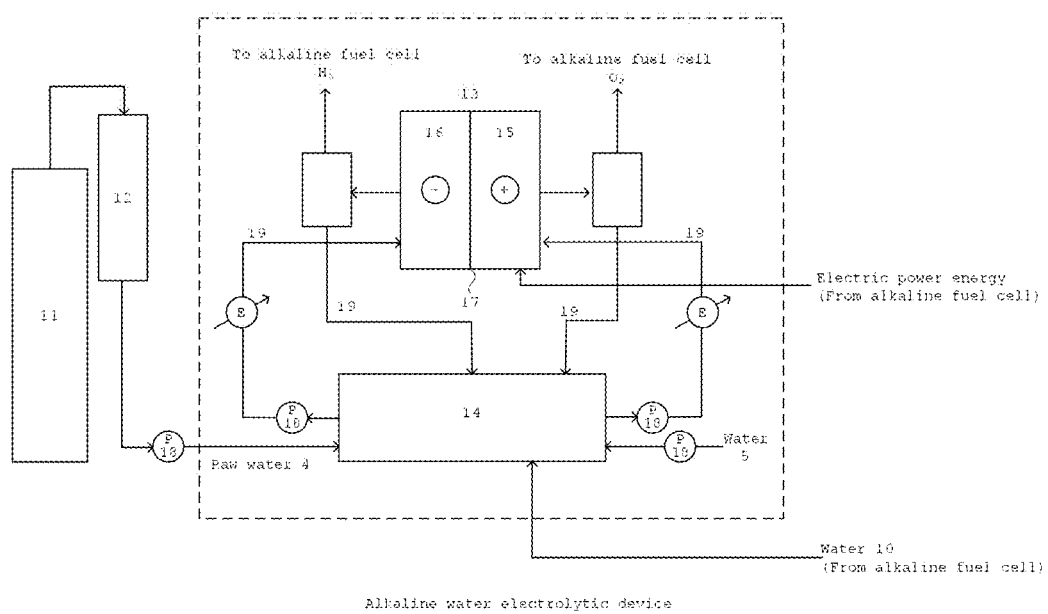

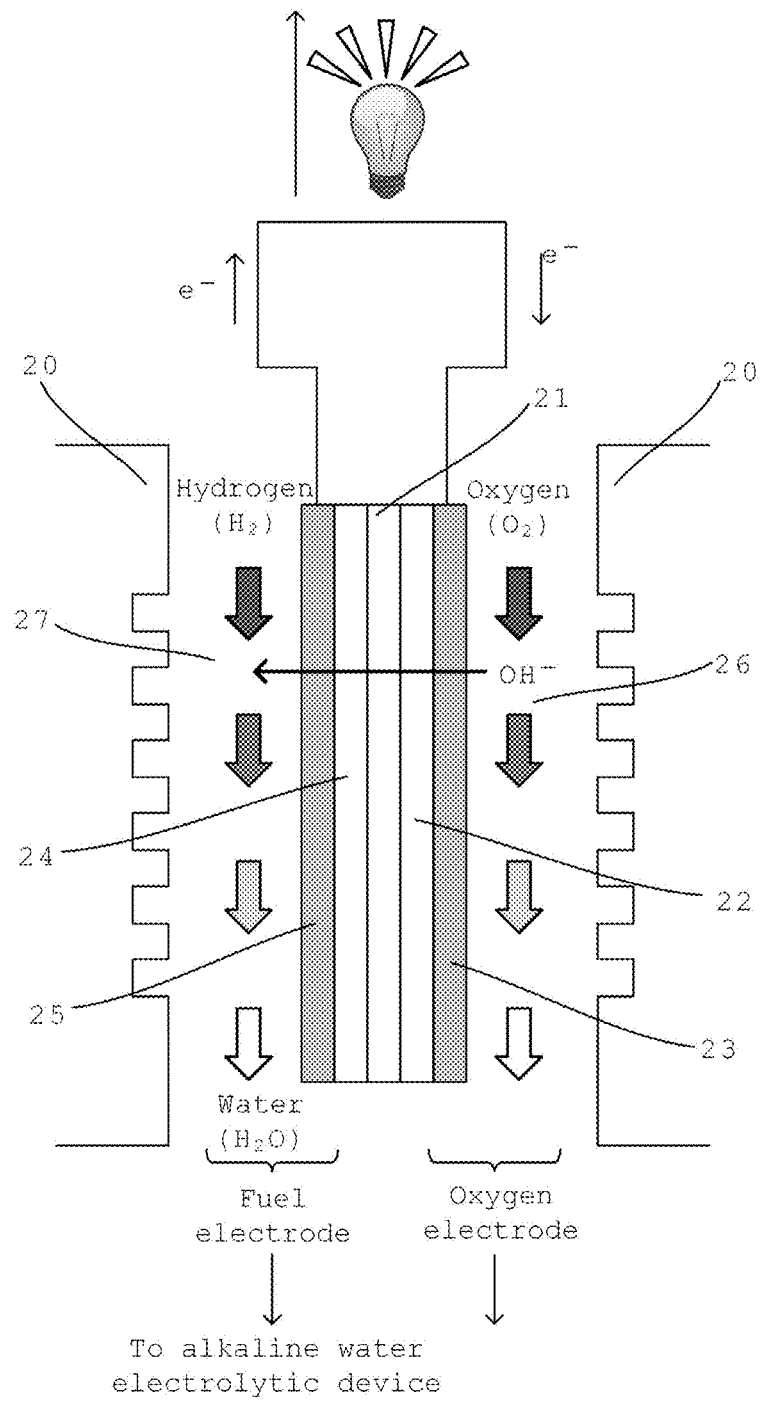
[Fig. 3]

[Fig. 4]
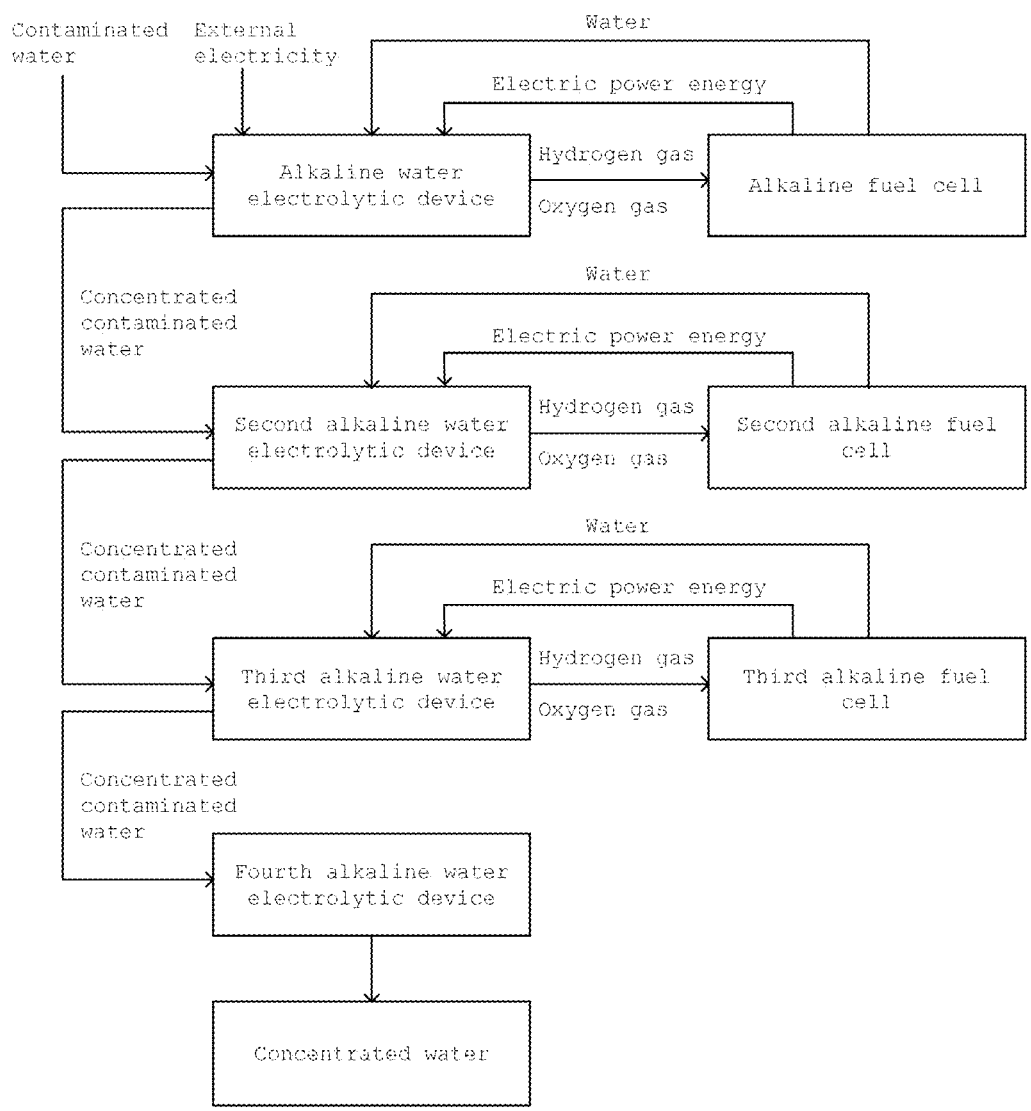

WATER TREATMENT SYSTEM USING ALKALINE WATER ELECTROLYSIS DEVICE AND ALKALINE FUEL CELL

TECHNICAL FIELD

The present invention relates to a water treatment system using an alkaline water electrolytic device and an alkaline fuel cell in which an alkaline water electrolytic device and an alkaline fuel cell each having an alkaline aqueous solution as an electrolytic solution are combined, hydrogen and oxygen generated by the alkaline water electrolytic device are used as raw materials for the alkaline fuel cell to generate electric power, and an electrolytic treatment is performed by the alkaline water electrolytic device using the resulting electric energy and water.

The present invention also relates to a water treatment system using an alkaline water electrolytic device and an alkaline fuel cell in which to an alkaline water electrolytic device and an alkaline fuel cell, 2nd, 3rd, ... and nth alkaline water electrolytic devices and 2nd, 3rd, ... and nth alkaline fuel cells are connected in a cascade mode, electrolysis is performed continuously, and the volume of raw water is reduced by the alkaline water electrolytic device.

The present invention also relates to a water treatment system using alkaline water electrolysis and an alkaline fuel cell in which raw water material containing tritiated water is used as raw water, an alkaline water electrolytic device and an alkaline fuel cell each having an alkaline aqueous solution as an electrolytic solution are combined, hydrogen and oxygen generated by the alkaline water electrolytic device are used as raw materials for the alkaline fuel cell to generate electric power, an electrolytic treatment is performed by the alkaline water electrolytic device using the resulting electric energy and water, 2nd, 3rd, ... and nth alkaline water electrolytic devices and 2nd, 3rd, ... and nth alkaline fuel cells are connected to the alkaline water electrolytic device and the alkaline fuel cell in a cascade mode, electrolysis is performed continuously, the raw water containing tritiated water in a high concentration is sequentially concentrated, and a small amount of concentrated contaminated water is collected.

The present invention also relates to a water treatment system using an alkaline water electrolytic device and an alkaline fuel cell in which raw water containing a large amount of impurities such as chloride ions is used as raw water containing tritiated water, the impurities are removed, and electrolysis is then performed.

BACKGROUND ART

Most of tritium existing on the ground is in the form of tritium water as an oxide, i.e., tritiated water. The concentration of tritiated water circulating in the atmosphere is considered to have roughly a fixed value in all ages and countries and including animals and plants. A period during which tritiated water falls out of atmospheric circulation can be detected from an amount of decrease in underwater concentration, so that the age of groundwater can be measured. This measurement is utilized for practical examination on flow of groundwater in the fields of civil engineering and agriculture. Tritium exists in water in the form of tritiated water with tritium bound with oxygen. The tritiated water is dispersively distributed widely in vapor, rainfall, groundwater, river water, lake water, sea water, drinking water and organisms as a gas phase, a liquid phase and a solid phase in the hydrosphere.

Natural tritium is generated by a reaction of a cosmic ray with the air, and the amount of natural tritium is very small because its generation probability is very small. On the other hand, tritium generated through nuclear tests in the 1950s, nuclear reactors and reprocessing of nuclear fuels is released in the environment in a large amount (fall-out tritium). In an installation associated with a nuclear reactor, tritium is generated during operation and maintenance of the reactor and reprocessing of nuclear fuels, and accumulated and localized at a higher level in comparison with the external environment. The tritium is systematically released to the atmosphere and sea because its chemical nature is almost comparable to that of hydrogen.

The highest value measured in Japan is 1,100 Bq/L, a value detected in Jun. 21, 2013 at a dedicated port within the site of Fukushima No. 1 Nuclear Plant where the nuclear accident occurred. Since tritium is difficult to chemically separate from hydrogen, studies on a method for physically separating tritium have been conducted. However, remained only at an experimental level, and such a method has not been put into practical use yet. Therefore, radioactivity from tritium released in the environment due a nuclear accident etc. cannot be eliminated by current techniques. The amount of contaminated water containing tritium generated in Fukushima No. 1 Nuclear Plant is said to reach an 800,000 $m^3$ scale in future, and early establishment of an effective method for disposing of the contaminated water is desired.

As methods for collecting tritium, a water distillation method using a vapor pressure of $H_2O$, HTO and $T_2O$, a water-hydrogen exchange method using an exchange reaction of H and T atoms, a double temperature exchange method using an isotope chemical equilibrium shift, and a water electrolytic method using a gas generation potential difference are conceivable. However, efficient separation of tritium is difficult in the methods except for the water electrolytic method.

On the other hand, in the electrolytic method, the separation factor is considerably high, so that tritium can be efficiently separated.

However, the tritium concentration is extremely low, and therefore when the concentration of tritium is measured, electrolytic concentration is generally performed for improvement of measurement accuracy. Here, for electrolytic concentration of heavy water, a method has been heretofore known in which a sample solution with an electrolyte dissolved therein is prepared, and electrolysis is performed with tabular flat shapes faced each other. Water contained in an electrolytic solution includes HDO and HTO in addition to $H_2O$, and they are usually decomposed into hydrogen and oxygen according to water decomposition. The isotope effect causes decomposition of $H_2O$ to precede decomposition of HDO and HTO, so that the concentrations of deuterium and tritium are increased to perform concentration. In the electrolytic concentration, nickel is used as an anode, and steel, iron, nickel and the like are used as a cathode. These electrodes are cleaned, a water sample prepared by adding lean caustic soda as a support salt to a solution of water including heavy water is added in a glass container, and electricity is supplied to perform electrolysis. At this time, with the current density set to about 1 to 10 $A/dm^2$, concentration of heavy hydrogen is performed usually until the liquid amount decreases by a factor of 10 or more while the liquid temperature is kept at 5° C. or lower for preventing evaporation of water by generation of heat.

That is, electrolytic concentration of tritium takes advantage of the disposition in which tritiated water is harder to be electrolyzed than light hydrogen water as in the case of the heavy water. The method including inserting metal electrodes in an alkaline aqueous solution to perform electrolysis has been already subjected to many studies, and publicly formalized as a standard method. In this method, tritium concentration is performed in a single stage. In practice, however, conventional electrolytic concentration methods have some problems. These problems include the following: experimental operations are complicated; the tritium concentration ratio is limited by the upper limit of the electrolyte concentration; a mixed gas of hydrogen and oxygen may be generated to cause explosion; much time is required for electrolysis; and electric power consumption becomes enormous, so that it is difficult to treat a large volume of water.

The present inventors developed a method for electrolytically concentrating heavy water, which solves the problems of conventional techniques, and is capable of electrically concentrating and fractionating a raw water containing a large amount of heavy water by an alkaline water electrolytic method, and also producing a high-purity hydrogen gas and/or a high-purity oxygen gas, as a method for treating raw water containing a large amount of tritiated water by alkaline water electrolysis, and applied for a patent thereof (Patent Literature 1).

According to Patent Literature 1, there can be provided a method for electrolytically concentrating heavy water, the method including electrolytically concentrating heavy water using an alkaline water electrolytic bath including: an anode chamber for storing an anode; a cathode chamber for storing a cathode; and a diaphragm for dividing the anode chamber and the cathode chamber from each other, wherein from a circulation tank for storing an electrolytic solution with high-concentration alkaline water added to raw water including heavy water containing tritium, the electrolytic solution is circulated and fed to both electrolytic chambers; the anode chamber to which an anode-side gas-liquid separation device and anode-side water sealing device are connected; the cathode chamber to which a cathode-side gas-liquid separation device and cathode-side water sealing device are connected; electrolysis is continued to concentrate heavy water in the electrolytic solution while the electrolytic solution from which a generated gas is removed by the anode-side gas-liquid separation device and the cathode-side gas-liquid separation device is circulated and fed to the circulation tank to keep constant the alkali concentration of the electrolytic solution fed into both the electrolytic chambers; a hydrogen gas is collected or discarded by the cathode-side gas-liquid separation device, and an oxygen gas is collected or discarded by the anode-side gas-liquid separation device.

Further, according to the method described in Patent Literature 1, a radioactive waste containing a large amount of tritium can be efficiently concentrated and fractionated by electrolysis, and a high-concentration and high-purity hydrogen gas and oxygen gas can be efficiently collected.

However, the method described in Patent Literature 1 has the disadvantage that electric power consumption becomes enormous as described above, and this disadvantage is the biggest obstacle to employment of an electrolytic method.

The present inventors conducted studies on reduction of electric power consumption by combination of an alkaline water electrolytic method and a fuel cell as a method for solving the disadvantage.

That is, in the water electrolytic method, a hydrogen gas and an oxygen gas are generated. Heretofore, these gases have been discarded, but a hydrogen gas and an oxygen gas which have been discarded heretofore can be used as a raw material in a fuel cell. Accordingly, the present inventors conducted studies on a method using, as a power source in a water electrolytic method, a fuel cell using as raw materials a hydrogen gas and an oxygen gas generated in the water electrolytic method.

Fuel cells are classified into the following types based on the type of electrochemical reaction and electrolyte.
(1) Alkaline fuel cell (AFC)
(2) Phosphoric acid fuel cell (PAFC)
(3) Molten carbonate fuel cell (MCFC)
(4) Solid oxide fuel cell (SOFC)
(5) Proton conductive fuel cell (PEFC)
(6) Direct methanol fuel cell (DMFC)
(7) Bio-fuel cell (MFC)
(8) Direct formic acid fuel cell (DFAFC)

The currently mainstream fuel cells are proton conductive fuel cells (PEFC). The proton conductive fuel cell exhibits sufficient electric power generation performance with a hydrogen fuel. However, the proton conductive fuel cell has the problem of a high cost and small resource amount associated with noble metals because the fuel cell operates under a strong acid atmosphere, and therefore the catalyst to be used is almost limited to a platinum-based noble metal.

The PEFC includes a fuel electrode, an oxygen electrode and an electrolyte layer. A solid polymer (cation exchange membrane) containing a strong-acidic electrolyte aqueous solution is used for the electrolyte layer. A hydrogen gas is introduced into the fuel electrode, an oxygen gas is introduced into the oxygen electrode, the following reactions take place at the electrodes, and as a whole, water is generated according to the following reaction.

Whole $2H_2 + O_2 \rightarrow 2H_2O$

Fuel electrode (negative electrode) $H_2 \rightarrow 2H^+ + 2e^-$

Oxygen electrode (positive electrode) $4H^+ + O_2 + 4e^- \rightarrow 2H_2O$

Protons ($H^+$) generated at the fuel electrode diffuse through the solid polymer membrane (cation exchange membrane) to move to the oxygen electrode side, and react with oxygen ($O_2$) to generate a mist ($H_2O$), which is discharged from the oxygen electrode side.

Meanwhile, as the fuel cell, an alkaline electrolyte type fuel cell (AFC: alkaline fuel cell) is known. In the alkaline electrolyte type fuel cell, hydroxide ions are used as an ion conductor, and a separator between electrodes is impregnated with an alkaline electrolytic solution to form a cell. Like the PEFC, a type of cell using a polymer membrane has also been reported. The AFC is a fuel cell which has high reliability and is practically used in aerospace applications etc. because the AFC has the simplest structure and is used in an alkali atmosphere, and therefore an inexpensive electrode catalyst such as a nickel oxide can be used, and because a liquid electrolyte is used at normal temperature, and therefore the cell configuration can be simplified.

Meanwhile, in the case where hydrogen is extracted from a reformed hydrocarbon-based fuel, the alkaline electrolytic solution generates a carbonate to be degraded if a hydrocarbon is mixed therein. Similarly, when air is used as an oxidant, the electrolytic solution absorbs carbon dioxide to be degraded, and therefore it is necessary to use high-purity oxygen as an oxidant. For improving the purity of hydrogen, the fuel is made to pass through a palladium membrane to improve the purity of hydrogen. Since the electrolyte is an aqueous solution, the operation temperature range is limited to temperatures at which the electrolytic solution is not frozen and evaporated. Since the mobility (diffusion coefficient) of ions varies depending on the temperature, so that electric power generation is affected, the temperature condition is severe. Since the activity of a nickel-based catalyst is reduced by coordinating carbon monoxide, hydrocarbons, oxygen, water vapor and the like, the purity of a hydrogen fuel is important. The use of reformed hydrogen containing the above-described substances as impurities is not desired, and as oxygen and hydrogen, pure oxygen and hydrogen raw materials which do not contain $CO_2$ are required.

The chemical reaction formulae in the electrodes of the AFC are as follows.

Whole $2H_2+O_2 \rightarrow 2H_2O$

Fuel electrode (negative electrode) $2H_2+4OH^- \rightarrow 4H_2O+4e^-$

Oxygen electrode (positive electrode) $O_2+2H_2O+4e^- \rightarrow 4\text{-}OH$

Thus, the AFC has the advantage that as an electrode material, expensive platinum is not required to be used, and a relatively inexpensive metal material such as nickel, cobalt or iron can be used because the electrolyte is alkaline. Meanwhile, if a carbon dioxide gas etc. is mixed in hydrogen that is a raw material, the alkaline electrolytic solution forms a carbonate to be degraded. It is necessary to use high-purity oxygen as an oxidant for achieving a high power.

The present inventors have paid attention to the fact that as a raw material gas, pure hydrogen and oxygen, particularly a raw material that does not contain a carbonaceous substance is required in an alkaline fuel cell (AFC), and found that a hydrogen gas and an oxygen gas which are generated by an alkaline water electrolytic device are most suitable.

Meanwhile, in the alkaline water electrolytic device, a large amount of electric energy is required, and therefore if all the electric energy must be supplied from the outside, enormous costs are necessary.

With attention paid to the above respect, the present inventors have invented a water treatment system using an alkaline water electrolytic device and an alkaline fuel cell in which an alkaline water electrolytic device and an alkaline fuel cell (AFC) are combined with each other, whereby electric power required in the alkaline water electrolytic device and the alkaline fuel cell, a hydrogen gas and an oxygen gas serving as raw materials for the electric power, water for making up for water lost through the electrolytic treatment, and an electrolytic solution formed of the alkaline aqueous solution are effectively used by means of a circulation system within the process, rather than being newly fed from the outside.

CITATION LIST

Patent Literature

Patent Literature 1: JP 2015-029921 A

SUMMARY OF INVENTION

Technical Problem

With attention paid to the above respect, an object of the present invention is to provide a water treatment system using an alkaline water electrolytic device and an alkaline fuel cell in which an alkaline water electrolytic device and an alkaline fuel cell (AFC) are combined with each other, whereby a part of each of electric power required in the alkaline water electrolytic device and the alkaline fuel cell, a hydrogen gas and an oxygen gas serving as raw materials for the electric power, an electrolytic solution formed of the alkaline aqueous solution, an amount of water corresponding to water lost through the electrolytic treatment is circu-lated and used in the water treatment system, and raw material components and intermediate products are all effectively used, so that the alkaline water electrolytic device and the alkaline fuel cell can be efficiently operated.

Solution to Problem

For achieving the above-described object, a first solution in the present invention is a water treatment system using an alkaline water electrolytic device and an alkaline fuel cell, wherein (1) the alkaline water electrolytic device and the alkaline fuel cell are connected to each other, (2) an electrolytic solution obtained by mixing raw water and an alkaline aqueous solution and adjusting the mixture to a desired concentration, and an amount of water corresponding to water lost through an electrolytic treatment are fed to the alkaline water electrolytic device, and a continuous electrolytic treatment is performed while the alkali concentration is kept at an initial concentration and the electrolytic solution is circulated to reduce the volume of the raw water, generate an oxygen gas from an anode chamber of the alkaline water electrolytic device, and generate a hydrogen gas from a cathode chamber of the alkaline water electrolytic device, (3) the electrolytic solution formed of an alkaline aqueous solution adjusted to a desired concentration and an oxygen gas and a hydrogen gas generated by the alkaline water electrolytic device are fed to the alkaline fuel cell, at least a part of the oxygen gas and hydrogen gas is used to generate electric power by the alkaline fuel cell, and electric energy and water are collected, and (4) the collected electric energy is fed to the alkaline water electrolytic device as an electric power source thereof, and a part or all of the collected water is fed to a circulation line of the electrolytic solution in the alkaline water electrolytic device to continue the electrolytic treatment, whereby most or a part of each of electric power energy required in the alkaline water electrolytic device and the alkaline fuel cell, a hydrogen gas and an oxygen gas serving as raw materials for the electric power energy, and an amount of water corresponding to water lost through the electrolytic treatment is effectively used while being circulatory used efficiently in the water treatment system.

For achieving the above-described object, a second solution in the present invention is the water treatment system using an alkaline water electrolytic device and an alkaline fuel cell, wherein 2nd, 3rd, . . . and nth alkaline water electrolytic devices and 2nd, 3rd, . . . and nth alkaline fuel cells are connected to the alkaline water electrolytic device and the alkaline fuel cell in a cascade mode, an electrolytic solution electrolytically treated and concentrated by the alkaline water electrolytic device is sequentially fed to the 2nd, 3rd, . . . and nth alkaline water electrolytic devices, an electrolytic treatment is performed in the same manner as in the alkaline water electrolytic device, an oxygen gas and a hydrogen gas generated are fed to at least one of the alkaline fuel cell and the 2nd, 3rd, . . . and nth alkaline fuel cells, at least a part of the oxygen gas and hydrogen gas is used to generate electric power by at least one of the alkaline fuel cell and the 2nd, 3rd, . . . and nth alkaline fuel cells, electric energy is collected, water is generated, the collected electric energy is fed to at least one of the alkaline water electrolytic device and the 2nd, 3rd, . . . and nth alkaline water electrolytic devices to continue the electrolytic treatment, water generated in the electric power generation by at least one of the alkaline fuel cell and the 2nd, 3rd, . . . and nth alkaline fuel cells is discarded or fed to a circulation line of the electrolytic solution in at least one of the alkaline water electrolytic device and the 2nd, 3rd, . . . and nth alkaline water electrolytic devices, and the volume of the raw water subjected to volume reduction by the alkaline water electrolytic device is further reduced by the 2nd, 3rd, . . . and nth alkaline water electrolytic devices.

For achieving the above-described object, a third solution in the present invention is the water treatment system using an alkaline water electrolytic device and an alkaline fuel cell, wherein pure water is used as the raw water.

For achieving the above-described object, a fourth solution in the present invention is the water treatment system using an alkaline water electrolytic device and an alkaline fuel cell, wherein raw water containing tritiated water is used as the raw water.

For achieving the above-described object, a fifth solution in the present invention is the water treatment system using an alkaline water electrolytic device and an alkaline fuel cell, wherein raw water containing tritiated water containing a large amount of impurities including chloride ions is used as the raw water.

For achieving the above-described object, a sixth solution in the present invention is the water treatment system using an alkaline water electrolytic device and an alkaline fuel cell, wherein the alkaline water electrolytic device and the 2nd, 3rd, . . . and nth alkaline water electrolytic devices are diaphragm type alkaline water electrolytic devices each including: an anode and a cathode each composed of an electrode formed of a Ni or iron base material, or an electrode obtained by subjecting the surface of the base material to Raney nickel coating, Ni-based dispersion plating or noble metal-based pyrolytic coating; and a diaphragm.

For achieving the above-described object, a seventh solution in the present invention is the water treatment system using an alkaline water electrolytic device and an alkaline fuel cell, wherein the alkaline fuel cell and the 2nd, 3rd, . . . and nth alkaline fuel cells are alkaline membrane type fuel cells each including: a positive electrode and a negative electrode each formed of an electrode material with a platinum catalyst or a ruthenium-platinum alloy catalyst carried on a carbon black carrier; and an anion exchange membrane.

For achieving the above-described object, an eighth solution in the present invention is the water treatment system using an alkaline water electrolytic device and an alkaline fuel cell, wherein raw water containing tritiated water containing a large amount of impurities including chloride ions is used as the raw water, a distillation process for removing the impurities is provided as a pre-process of an alkaline water electrolytic process by the alkaline water electrolytic device, the raw water containing large amount of impurities including chloride ions is supplied to the distillation process to remove the impurities as a salt slurry, and the raw water containing tritiated water after removal of the impurities is supplied to the alkaline water electrolytic device.

For achieving the above-described object, a ninth solution in the present invention is the water treatment system using an alkaline water electrolytic device and an alkaline fuel cell, wherein in the distillation process, the salt slurry is concentrated, and separated and collected as a solid.

For achieving the above-described object, a tenth solution in the present invention is the water treatment system using an alkaline water electrolytic device and an alkaline fuel cell, wherein 5 to 60 mass % alkaline aqueous solution is used as the electrolytic solution formed of an alkaline aqueous solution, which is used for the electrolytic treatment by the alkaline water electrolytic device and the 2nd, 3rd, . . . and nth alkaline water electrolytic devices and used in the alkaline fuel cell and the 2nd, 3rd, . . . and nth alkaline fuel cells.

Advantageous Effects of Invention (1) In the water treatment system using an alkaline water electrolytic device and an alkaline fuel cell according to the present invention, an alkaline water electrolytic device and an alkaline fuel cell are combined, and alkaline electrolysis is performed by utilizing electric power generated by the alkaline fuel cell using as raw materials a hydrogen gas and an oxygen gas which are generated by electrolysis in the alkaline water electrolytic device itself as electric power required in the alkaline water electrolytic device. Thus, after the start of electrolysis, alkaline water electrolysis can be continued using electric power generated in the system as electric power for alkaline water electrolysis, and electrolysis can be performed while electric power is regenerated, so that electric power costs required for water treatment can be considerably reduced.

(2) In the water treatment system using an alkaline water electrolytic device and an alkaline fuel cell according to the present invention, a hydrogen gas and an oxygen gas generated by electrolysis in the alkaline water electrolytic device are used as a hydrogen gas and an oxygen gas as raw materials for the alkaline fuel cell. Therefore, it is unnecessary to supply the hydrogen gas and oxygen gas from the outside, and electric energy to be used as an electric power source for alkaline water electrolysis can be circulated and used in the system, so that energy can be efficiently used.

(3) In the water treatment system using an alkaline water electrolytic device and an alkaline fuel cell according to the present invention, a hydrogen gas and an oxygen gas generated by electrolysis in the alkaline water electrolytic device may be used as a hydrogen gas and an oxygen gas as raw materials for the alkaline fuel cell. Thus, it is unnecessary to supply the hydrogen gas and oxygen gas from the outside, so that costs of electric power used for electrolysis can be considerably reduced.

(4) In the water treatment system using an alkaline water electrolytic device and an alkaline fuel cell according to the present invention, a hydrogen gas and an oxygen gas generated by electrolysis in the alkaline water electrolytic device may be used as a hydrogen gas and an oxygen gas as raw materials for the alkaline fuel cell. Therefore, pure oxygen and hydrogen free from impurities such as a carbonaceous substance and a carbon dioxide gas can be used as raw materials, so that the alkaline fuel cell can be efficiently operated.

(5) In the water treatment system using an alkaline water electrolytic device and an alkaline fuel cell according to the present invention, as raw materials for the alkaline fuel cell, not only the hydrogen gas and oxygen gas can be used, but also an electrolytic solution that is used for electrolysis in the alkaline water electrolytic device can be used as the electrolytic solution formed of an alkaline aqueous solution. Thus, for all the raw materials for the alkaline fuel cell, all the materials that are used or generated by the alkaline water electrolytic device can be circulated and used.

(6) In the water treatment system using an alkaline water electrolytic device and an alkaline fuel cell according to the present invention, electric power to be used for electrolysis in the alkaline water electrolytic device is partially fed from the alkaline fuel cell after the start of electrolysis. Water generated by the alkaline fuel cell is used as supplementary water for water lost through electrolysis in the alkaline electrolytic device. Thus, all the raw materials for the alkaline water electrolytic device can be supplied by electric power and water that are generated by the alkaline fuel cell.

(7) In the water treatment system using an alkaline water electrolytic device and an alkaline fuel cell according to the present invention, the raw water containing tritiated water containing a large amount of impurities such as chloride ions can also be treated to achieve the above-described effects, by providing a distillation process for continuously feeding the raw water material to distiller as a pre-process to remove the impurities as a salt slurry.

BRIEF DESCRIPTION OF DRAWINGS

FIG. 1 is a conceptual view illustrating one embodiment of a water treatment system using an alkaline water electrolytic device and an alkaline fuel cell according to the present invention.

FIG. 2 is a flow chart illustrating one example of an alkaline water treatment device to be used in one embodiment of the water treatment system using an alkaline water electrolytic device and an alkaline fuel cell according to the present invention.

FIG. 3 is a flow chart illustrating one example of an alkaline fuel cell to be used in one embodiment of the water treatment system using an alkaline water electrolytic device and an alkaline fuel cell according to the present invention.

FIG. 4 is a flow chart illustrating, as another embodiment of the present invention, one example of the water treatment system using an alkaline water electrolytic device and an alkaline fuel cell according to the present invention.

DESCRIPTION OF EMBODIMENTS

Hereinafter, one embodiment of the present invention will be described with reference to the drawings.

FIG. 1 is a conceptual view illustrating one embodiment of a water treatment system according to the present invention.

As illustrated in FIG. 1, in the first embodiment of the present invention, (1) an alkaline water electrolytic device 1 and an alkaline fuel cell 2 are connected to each other;

(2) an electrolytic solution 3 formed of an alkaline aqueous solution adjusted to a desired concentration, raw water 4, and an amount of water 5 corresponding to raw water lost through the electrolytic treatment are fed to the alkaline water electrolytic device 1, the volume of the raw water 4 is reduced by performing an electrolytic treatment while circulating the electrolytic solution 3 with the alkali concentration kept at an initial concentration in the alkaline water electrolytic device 1, and an oxygen gas 6 and a hydrogen gas 7 are generated by the alkaline water electrolytic device 1.

(3) the oxygen gas 6 and the hydrogen gas 7 generated by the alkaline water electrolytic device 1, and the electrolytic solution 3 formed of an alkaline aqueous solution adjusted to a desired concentration are fed to the alkaline fuel cell 2, electric power is generated by the alkaline fuel cell 2, and electric energy 9 and water 10 are collected.

(4) the collected electric energy 9 is fed to the alkaline water electrolytic device 1 as an electric power source thereof, and the water 10 collected from the alkaline fuel cell 2 is fed to a circulation line of the electrolytic solution formed of the alkaline aqueous solution, and can be used as water for adjusting the alkali concentration or water to be fed to an alkaline water electrolytic bath in the next cascade, or can be discarded when containing impurities.

In this manner, the alkaline water electrolytic device 1 and the alkaline fuel cell 2 (AFC) are combined with each other, whereby the electric energy 9 required in the alkaline water electrolytic device 1 and the alkaline fuel cell 2, the hydrogen gas 7 and the oxygen gas 6 serving as raw materials for the electric power, the electrolytic solution 3 formed of the alkaline aqueous solution, and a partial amount of water 10 corresponding to raw water lost through the electrolytic treatment are circulated and used in the water treatment system. Thereby, the raw material components and the intermediate products are circulated and used, so that the alkaline water electrolytic device 1 and the alkaline fuel cell 2 can be efficiently operated, electric power costs can be considerably reduced, the volume of the raw water can be efficiently reduced, both the hydrogen gas and the oxygen gas generated by the alkaline water electrolytic device 1 can be used as a pure fuel for the alkaline fuel cell without being discarded, and thus a non-wasteful efficient water treatment system can be provided.

In the present invention, when pure water is used as raw water or when raw water containing a very small amount of impurities is used, an electrolytic treatment can be performed using a hydrogen gas and an oxygen gas which are generated by the alkaline water electrolytic device 1, for most of a fuel for the alkaline fuel cell 2 that is used as an electric power source for the alkaline water electrolytic device 1. Therefore, it is unnecessary to supply large-capacity energy from the outside. Electrolysis is performed while an electrolytic solution is circulated, and thus the hydrogen gas and the oxygen gas serving as a fuel for the alkaline fuel cell can be continuously generated, and continuously fed to the alkaline fuel cell to continue the operation of the alkaline water electrolytic device, so that a water treatment can be performed inexpensively and efficiently.

The utilization rate of a hydrogen gas and an oxygen gas which are generated by the alkaline water electrolytic device is around 60% in one-time cell inside passage reaction depending on the contact state of the gas with a catalyst in the alkaline fuel cell. The utilization rate of the gas generated from the 2nd, 3rd . . . nth alkaline water electrolytic devices is similarly around 60% in one-time cell inside passage reaction.

Further, in the alkaline water electrolytic device, raw water or pure water is supplied from outside the system during electrolysis for keeping the alkali concentration at an initial concentration. According to the present invention, water 10 that is generated by the alkaline fuel cell 2 can be used as the water to be supplied, and therefore the introduction amount of water to be newly supplied from the outside can be reduced. The utilization rate of water in this case is comparable to the utilization rate of the gas. When the utilization rate of the generated gas is 60%, the utilization rate of water is about 60%.

Further, in the alkaline water electrolytic device and the alkaline fuel cell, it is necessary to use an electrolytic solution formed of an alkaline aqueous solution. According to the present invention, the concentration of alkaline aqueous solution to be used is 5 to 60% by mass in both the devices, and the alkaline aqueous solution can be shared by both the devices.

As described above, the water treatment system according to the present invention is one in which an alkaline fuel cell and an alkaline water electrolytic device are connected to each other. First, the alkaline water electrolytic device in the present invention will be described.

The present invention is particularly advantageous when tritiated water-containing contaminated water is treated as the raw water. Hereinafter, a case will be described where raw water including contaminated water containing tritium is used. The same applies to a case where pure water is used as the raw water.

(1) Alkaline Water Electrolytic Device

FIG. 2 illustrates one embodiment of the alkaline water electrolytic device to be used in the water treatment system of the present invention, which can be applied to raw water containing tritiated water that does not contains impurities such as chloride ions or contains the impurities to a degree of not hindering the operation of the electrolytic system. In this case, an alkaline water electrolytic treatment is continuously performed while the alkali concentration of the raw water containing tritiated water is kept constant without providing a pre-process for removing impurities.

FIG. 2 illustrates the alkaline water electrolytic device. The alkaline water electrolytic device includes a raw water storage tank 11, a raw water treatment bath 12, an alkaline water electrolytic bath 13, a circulation tank 14, an electrolytic solution circulation pipe 19 and a feeding pump 18. The alkaline water electrolytic bath 13 includes an anode chamber 15 for storing an anode, a cathode chamber 16 for storing a cathode, and a diaphragm 17 for dividing the anode chamber 15 and the cathode chamber 16 from each other. The diaphragm 17 is preferably a neutral diaphragm, but a cation exchange membrane may also be used.

In this embodiment, the later-described distillation process for removing impurities such as chloride ions contained in the raw water containing tritiated water is not necessary, and the raw water containing tritiated water may be fed directly to the circulation tank 14 of the alkaline water electrolytic device. At this time, for example, the raw water may be fed from the raw water storage tank 11 for storage to the circulation tank 14 through the raw water treatment bath 12 to which a part of the raw water is transferred as an object to be treated as illustrated in FIG. 2.

Raw water containing tritiated water that does not contain impurities such as chloride ions can be treated by the alkaline water electrolytic device illustrated in FIG. 2.

Even in the case where raw water containing tritiated water containing impurities such as chloride ions is used, the raw water containing tritiated water can be treated in this embodiment when the treatment amount is small or the treatment time is short; the amount of impurities is small; or the system is configured to remove impurities during continuous electrolysis.

Hereinafter, a case will be described where as raw water containing tritiated water, 800,000 m$^3$ of raw water containing only a small amount of impurities such as chloride ions is treated by an alkaline water electrolytic system (I).

(a) In this embodiment, the object to be treated in the alkaline water electrolytic device is 800,000 m$^3$ of raw water containing tritiated water which is stored in the raw water storage tank 11. As a part of the raw water, 400 m$^3$/day of raw water is fed from the raw water storage tank 11 through the raw water treatment bath 12 to the circulation tank 14 by the pump 18. In parallel, alkaline aqueous solution is fed to the circulation tank 14 (not illustrated).

It is preferred that all of the raw water in the raw water storage tank 11 is fed to the circulation tank 14 through the raw water treatment bath 12, and electrically treated. However, when the amount of the raw water in the raw water storage tank 11 is large, it is preferred that the raw water is sent in a plurality of parts to the raw water treatment bath 12 to continuously treat the raw water in the raw water treatment bath 12. The same applies to embodiments and examples below.

The anodes and cathodes of the alkaline water electrolytic device and the 2nd, 3rd, . . . and nth alkaline water electrolytic devices are preferably electrodes formed of a Ni or iron base material, or electrodes with the surface of the base material plated with nickel, or coated with various kinds of materials such as Raney nickel and noble metals for reducing an electrode overvoltage.

(b) An electrolytic solution obtained by mixing the raw water and alkaline aqueous solution in the circulation tank 14 and adjusting the mixture to a desired alkali concentration in the circulation tank 14 is then fed to the alkaline water electrolytic bath 13 to perform an electrolytic treatment.

(c) The concentration of the alkaline aqueous solution in the electrolytic solution is preferably high. The concentration is preferably 5 to 60% by mass, more preferably not less than 15% by mass and not more than 60% by mass, further preferably not less than 20% by mass and not more than 60% by mass. The alkali to be used is preferably KOH or NaOH.

The volume of the electrolytic solution in the alkaline water electrolytic bath 13 is 400 m$^3$. The volume of the electrolytic solution in the circulation tank 14, a pipe and so on is 400 m$^3$. Thus, the total electrolytic process volume is 800 m$^3$.

(d) The electrolytic solution mixed in the circulation tank 14 and controlled to a desired alkali concentration is fed to the anode chamber 15 of the alkaline water electrolytic bath 13 through the electrolytic solution circulation pile 19 by a circulation pump 18, fed to the cathode chamber 16 of the alkaline water electrolytic bath 13 through the electrolytic solution circulation pipe 19 by the circulation pump 18, and electrolyzed. The electrolytic solution is electrolyzed through the diaphragm 17. As a result of the electrolysis, in the anode chamber 15, an oxygen gas is generated, the generated oxygen gas and the electrolytic solution are separated from each other. The separated electrolytic solution is circulated to the circulation tank 14 by the electrolytic solution circulation pipe 19.

At the same time, in the cathode chamber 16, a hydrogen gas is generated. The generated hydrogen gas and the electrolytic solution are separated from each other. The separated electrolytic solution is circulated to the circulation tank 14 by the electrolytic solution circulation pipe 19. When the current density at this time is a high current density, the time required for the electrolytic treatment can be reduced. While the range of the operation current density depends on the performance of the electrolytic bath, particularly the structures of main elements thereof including an anode, a cathode, a diaphragm and an electrolytic bath, etc., the current density is preferably not less than 5 A/dm$^2$ and not more than 80 A/dm$^2$. The current density is further preferably not less than 5 A/dm$^2$ and not more than 60 A/dm$^2$. Particularly, when the amount of gas formation in electrolysis of water is set to be small, the process amount inevitably decreases, and when large-volume electrolysis is attempted, the process amount generally increases.

According to the studies by the present inventors, for alkaline water electrolysis, even an electrolytic solution having an alkali concentration of 32% by mass can be electrolyzed. However, it is not advantageous that the alkali concentration is higher than 32% by mass because the viscosity of the electrolytic solution increases, the generated gas is no longer quickly discharged to outside the system, and the cell voltage becomes high, leading to an increase in energy consumption.

Where the electrolytic treatment amount is 400 m³/day in the above-described method, the whole of 800,000 m³ of raw water containing tritiated water will be treated in 5.5 years (800,000 m³ 400 m3/day 365 days=5.5 years).

Since the circulation liquid amount of the electrolytic solution at this time is 800 m³, the amount of tritiated water-containing water will be reduced from 800,000 m³ to 800 m³ in 5.5 years.

(e) In the above-described long-term treatment, an amount of raw water corresponding to raw water lost through the electrolytic treatment is continuously fed from the inside of the storage tank 11 to the circulation tank 14, and the alkali concentration of the electrolytic solution is kept at an initial concentration. The electrolysis continued while the electrolytic solution is circulated, so that the whole of a large amount of raw water stored in the storage tank 11 is electrolytically treated.

(f) As a result of the treatment in the alkaline water electrolytic device, the raw water containing tritiated water (HTO) is formed into a gas, and converted into a tritium gas (HT)-containing hydrogen gas and an oxygen gas. The concentration of tritium in the tritium gas (HT)-containing hydrogen gas is reduced to 1/1,244 as compared to that in the tritiated water, and the volume of the raw water is reduced from 800,000 m³ to 800 m³.

In the above-described continuous electrolytic method, tritiated water corresponding to water decomposed and lost in electrolysis is continuously fed to the process, and physical operating environments including the liquid amount in the electrolytic bath and the circulation pump discharge amount within the process are always kept unchanged. At this time, the amount of tritiated water fed to the process corresponds to the concentration in the raw water.

In the case where water is continuously fed, operations are carried out in such a manner as to keep the tritium concentration in the process at the concentration in the raw water, so that the concentration in the electrolytic bath does not increase. In this continuous operating condition, the gas generated in electrolysis is converted at a ratio corresponding to the concentration ratio of light water and tritiated water.

Examples of main specifications and performance in the alkaline water electrolytic device described above are as follows.
[Specifications]
1) Raw water including tritium-contaminated water: 800, 000 m³
2) Electrolytic treatment volume: treatment amount of 400 m³/day
3) Alkali: caustic soda, alkali concentration: 20% by mass
4) Discharged tritium concentration: $1.350 \times 10^3$ Bq/L
5) Alkaline water electrolytic bath: 48 baths (75 elements per bath)
6) Current density: 40 A/dm²
7) Electrolytic process: circulating electrolytic process+ continuous feeding of raw water to electrolytic process
[Performance]
The conversion ratio of tritium in raw water, depending mainly on the concentration of tritium in general, is 1.0 to 0.6 (where tritium is usually fractionated as a tritium molecular gas).

Where the concentration of tritium contained in the raw water is $4.2 \times 10^6$ Bq/L, the concentration of tritium contained in a raw material fluid after the treatment in the electrolytic system is as follows.

$$4.2 \times 10^6 \times 0.4/1.244 \text{ Bq/L} = 1.350 \times 10^3 \text{ Bq/L}$$

Here, the concentration limit in the exhaust or air is $7 \times 10^4$ Bq/L or less, and the tritiated water effluent standard is $6 \times 10^4$ Bq/L or less.

When raw water containing tritiated water contains a large amount of impurities such as chloride ions, it is necessary to remove the impurities before the raw water is fed to the alkaline water electrolytic device.

The alkaline fuel cell that collects electric power energy and water to be fed to the alkaline water electrolytic device will now be described.
(2) Alkaline Fuel Cell A hydrogen gas and an oxygen gas generated by the alkaline water electrolytic device have been heretofore released into the air to be discarded. However, in the present invention, the gases are sent to the alkaline fuel cell, and electric power energy is collected, sent to the alkaline water electrolytic device, and used as an electric power source for the alkaline water electrolytic device. The utilization rate of the generated gas was about 60%.

FIG. 3 illustrates one embodiment of the alkaline fuel cell for use in the present invention. In the alkaline fuel cell, an anion exchange membrane (electrolyte layer) 21 is provided between separators 20 and 20, a positive electrode catalyst layer 22 is provided on the oxygen electrode side of the anion exchange membrane (electrolyte layer) 21, and a gas diffusion layer 23 is provided on the outside of the positive electrode catalyst layer 22. A negative electrode catalyst layer 24 is provided on the fuel electrode side of the anion exchange membrane (electrolyte layer) 21, and a gas diffusion layer 25 is provided on the outside of the negative electrode catalyst layer 24.

The anion exchange membrane 21 is impregnated with an electrolytic solution formed of an alkaline aqueous solution with a desired concentration. For the electrolytic solution formed of an alkaline aqueous solution, an electrolytic solution with a concentration almost equal to that of the electrolytic solution to be used in the alkaline water electrolytic device is used. The concentration of the alkaline aqueous solution of the electrolytic solution is preferably high, specifically 5 to 60% by mass. The alkali to be used is preferably KOH or NaOH.

The hydrogen gas and the oxygen gas generated by the alkaline water electrolytic device pass through a buffer tank before being fed to the alkaline fuel cell, so that the hydrogen gas and the oxygen gas are fed to the alkaline fuel cell without stagnation.

In the present invention, the anion exchange membrane is impregnated with the electrolytic solution formed of an alkaline aqueous solution, the oxygen gas generated by the alkaline water electrolytic device is then fed into the alkaline fuel cell through a channel 26 provided on the positive electrode catalyst layer 22 side, and the hydrogen gas generated by the alkaline water electrolytic device is fed to the alkaline fuel cell through a channel 27 provided on the negative electrode catalyst layer side.

The oxygen gas fed to the alkaline fuel cell through the channel 26 provided on the positive electrode catalyst layer 22 side passes through the gas diffusion layer 23. The oxygen reacts with water under the positive electrode catalyst layer 22 to generate hydroxyl ions (OH⁻), and the hydroxyl ions (OH⁻) move to the negative electrode catalyst layer side by passing through the anion exchange membrane 21, and reacts with the hydrogen gas to generate water.

The reaction formulae in the alkaline fuel cell are as follows.

Whole $2H_2+O_2 \rightarrow 2H_2O$

Fuel electrode (negative electrode) $2H_2+4OH^- \rightarrow 4H_2O+4e^-$

Oxygen electrode (positive electrode) $O_2+2H_2O+4e^- \rightarrow 4OH^-$

Preferably, the positive electrodes and negative electrodes of the alkaline fuel cell and the 2nd, 3rd, . . . and nth alkaline fuel cells are made of an electrode material with a platinum catalyst or a ruthenium-platinum alloy catalyst carried on a carbon black carrier.

Since an alkaline fuel cell is used as a fuel cell, for the alkaline aqueous solution to be used in the fuel cell, the alkaline aqueous solution used for the electrolytic solution in the alkaline water electrolytic device can also be used as an electrolytic solution in the fuel cell.

For the hydrogen gas and the oxygen gas that are used in the alkaline fuel cell for use in the present invention, pure hydrogen and oxygen that do not contain a carbonaceous substance can be used, so that efficiency is extremely improved.

When air is used as an oxidant, the electrolytic solution absorbs carbon dioxide to be degraded. However, as in the present invention, an oxygen gas generated by alkaline water electrolysis is a high-purity oxygen gas, so that the problem of degradation of the electrolytic solution does not occur. Since the electrolyte is an aqueous solution, equipment is inexpensive.

In contrast, for example, automobile alkaline fuel cells which have been previously developed and used cannot be used efficiently because air is used as an oxygen gas, and thus an electrolytic solution formed of an alkaline aqueous solution may be degraded by carbon dioxide etc. contained in the air when circulated and used.

Next, as another embodiment of the water treatment system according to the present invention, 2nd, 3rd, . . . and nth alkaline water electrolytic devices and 2nd, 3rd, . . . and nth alkaline fuel cells are connected to an alkaline water electrolytic device 1 and an alkaline fuel cell 2 in a cascade mode, respectively. An electrolytic solution electrolytically treated by the alkaline water electrolytic device is fed to at least one of the 2nd, 3rd, . . . and nth alkaline water electrolytic devices, and an electrolytic treatment is performed in the same manner as in the alkaline water electrolytic device 1. An oxygen gas and a hydrogen gas generated are fed to at least one of the alkaline fuel cell 2 and the 2nd, 3rd, . . . and nth alkaline fuel cells. At least a part of the oxygen gas and hydrogen gas is used to generate electric power by at least one of the alkaline fuel cell and the 2nd, 3rd, . . . and nth alkaline fuel cells, electric energy is collected, and water is generated. The collected electric energy is fed to at least one of the alkaline water electrolytic device and the 2nd, 3rd, . . . and nth alkaline water electrolytic devices to continue the electrolytic treatment. Water generated in the electric power generation by the alkaline fuel cell and the 2nd, 3rd, . . . and nth alkaline fuel cells is used as supplementary water for raw water lost through the electrolytic treatment by at least one of the alkaline water electrolytic device and the 2nd, 3rd, . . . and nth alkaline water electrolytic devices. The volume of the raw water subjected to volume reduction by the alkaline water electrolytic device is further reduced by the 2nd, 3rd, . . . and nth alkaline water electrolytic devices.

FIG. 4 illustrates one example where 2nd, 3rd, . . . and nth alkaline water electrolytic devices and 2nd, 3rd, . . . and nth alkaline fuel cells are connected to the alkaline water electrolytic device 1 and the alkaline fuel cell 2 in a cascade mode.

Contaminated water is used as raw water. First, the alkaline water electrolytic device is started by external electric power, and the resulting hydrogen gas and oxygen gas are sent to the alkaline fuel cell. Electric energy and water are collected by the alkaline fuel cell. Electrolysis is continued using the obtained electric energy. The obtained water is used as supplementary water for the alkaline water electrolytic device, alkaline water electrolysis is continued, and the contaminated water as raw water is concentrated. The concentrated contaminated water is sent to the second alkaline electrolytic device, electric energy and water are collected by the second fuel cell in the same manner as described above, and second alkaline water electrolysis is continued.

Electrolysis is continued by the third and fourth alkaline water electrolytic devices in the same manner, so that the concentrated contaminated water is further concentrated.

While the combination of the alkaline water electrolytic device and the alkaline fuel cell can be changed according to the treatment amount. Usually the treatment is suitably done in four stages as illustrated in FIG. 4.

One of the alkaline fuel cell and the 2nd, 3rd, . . . nth alkaline fuel cells may be provided for one of the alkaline water electrolytic device and the 2nd, 3rd, . . . nth alkaline fuel cells, or may be provided for two or more of the alkaline water electrolytic devices.

Further, water collected from the alkaline fuel cell and the 2nd, 3rd, . . . nth alkaline fuel cells may be supplied to make up for water lost through electrolysis in the alkaline water electrolytic device, or may be fed to raw water to be concentrated.

EXAMPLES

Examples of the present invention will now be described, but the present invention is not limited to these examples.

Example 1

A simulated liquid of raw water containing tritiated water that does not contain impurities (hereinafter, also referred to as a "simulated liquid"), a simulated liquid with the following components was used.

Simulated Liquid: 180 L

Initial concentration of tritium in simulated liquid: $4.2 \times 10^6$ Bq/L

As illustrated in FIG. 2, a raw water storage tank 11 containing 180 L of the simulated liquid was provided. In this test, the simulated liquid was fed from the raw material storage tank 11 to a circulation tank 14 through a treatment bath 12. Specifically, 9.67 L/day of the simulated liquid was fed from the raw material storage tank 11 to the circulation tank 14 through the treatment bath 12 by a pump 18. In this test, the simulated liquid was continuously fed in an alkaline water electrolytic device.

To the circulation tank 14, 9.60 L/day of the simulated liquid is fed by the pump 18, and also alkaline aqueous solution is fed. In the circulation tank 14, the simulated liquid and the alkaline aqueous solution are mixed, and adjusted to an electrolytic solution having an alkali concentration of 20% by mass. Continuous electrolysis is performed while 9.67 L/day of the electrolytic solution is circulated.

The volume of the electrolytic solution in an alkaline water electrolytic bath 13 is 30 L (two 15 dm² cells (each 15 L)), the volume of the electrolytic solution in the circulation tank 14, a pipe and so on is 12 L. Thus, the total electrolytic process volume is 42 L. The electrolytic solution obtained by mixing with the alkali in the circulation tank 14 and controlled to an alkali concentration of 20% by mass was fed to an anode chamber 15 of an alkaline water electrolytic bath 13 through the electrolytic solution circulation pipe 19 by a circulation pump 18, and fed to a cathode chamber 16 of the alkaline water electrolytic bath 13 through the electrolytic solution circulation pipe 19 by the circulation pump 18. In the anode chamber 15, an oxygen gas was generated, and the generated oxygen gas and the electrolytic solution are separated each from each other. The separated electrolytic solution was circulated to the circulation tank 14 through the electrolytic solution circulation pipe 19. At the same time, in the cathode chamber 16, a hydrogen gas was generated, gas-liquid separation occurred to separate the generated hydrogen gas and the electrolytic solution from each other. The separated electrolytic solution was circulated to the circulation tank 14 through the electrolytic solution circulation pipe 19.

As described above, in this embodiment, the electrolytic solution formed of simulated liquid (raw water) and alkaline aqueous solution was electrolyzed by an alkaline water electrolytic method as illustrated in FIG. 2 to decompose the raw water into oxygen and hydrogen. Tritium existing as water molecules in the raw water was fractionated from the raw water as tritium molecules. The water was decomposed into only hydrogen and oxygen gases by electrolysis. Therefore, after adjustment of the initial alkali concentration, electrolysis was performed while an amount of raw water (simulated liquid) corresponding to water lost through electrolysis was fed to the circulated electrolytic solution. If necessary, distilled water or pure water may be additionally fed in addition to raw water (simulated liquid) for keeping the alkali concentration at an initial concentration.

In this example, continuous alkaline electrolysis in the alkaline water electrolytic device was performed under the following conditions.

Electrolytic cell: two 15 dm² cell (each 15 L, total 30 L) were used.
Operation current density: 40 A/dm².
Concentration of caustic soda: NaOH, 20% by mass.
Membrane: diaphragm.
Anode/cathode: Ni base material+active coating.
Circulation: external circulation system.
Water sealing: water sealing system for control of gas pressure.
50 to 100 mmH₂O cathode pressure.
Electrolytic solution volume: 42 L (electrolytic cell: 30 L, circulation pipe etc.: 12 L).

The electrolytic current was 600 A (15 dm²×40 A/dm²).

In the continuous electrolytic method, an amount of simulated liquid (raw water) corresponding to water decomposed and lost in electrolysis is continuously fed to the process as described above, and physical operating environments including the liquid amount in the electrolytic bath and the circulation pump discharge amount within the process are always kept unchanged. In the case where simulated liquid (raw water) was continuously fed, operations were carried out in such a manner as to keep the tritium concentration in the process at the concentration in the simulated liquid, so that the concentration in the electrolytic bath did not increase. Therefore, in this continuous operating condition, the gas generated in electrolysis is converted at a ratio corresponding to the concentration ratio of light water and tritiated water.

The circulation liquid amount of the electrolytic solution at this time was 42 L, and thus the amount of tritiated water-containing water was reduced from 180 L to 42 L in 15.2 days (365 hours).

The alkaline water electrolytic device started electrolysis by means of a usual driving electric power source at the start of electrolysis. When the amount of the oxygen gas generated by electrolysis reached 1.044 L and the amount of the hydrogen gas generated by electrolysis reached 2.088 L, the gases were fed to the alkaline fuel cell illustrated in FIG. 3. In the alkaline fuel cell, an anion exchange membrane including a quaternary ammonium group is impregnated with the electrolytic solution formed of an alkaline aqueous solution with a 20% by mass of NaOH, the oxygen gas generated by the alkaline water electrolytic device is then fed into the alkaline fuel cell through a channel 26 provided on the positive electrode catalyst layer 22 side, and the hydrogen gas generated by the alkaline water electrolytic device is fed to the alkaline fuel cell through a channel 27 provided on the negative electrode catalyst layer side.

The oxygen gas fed to the alkaline fuel cell through the channel 26 provided on the positive electrode catalyst layer 22 side passes through the gas diffusion layer 23, and reacts with water under the positive electrode catalyst layer 22 to generate hydroxyl ions (OH⁻). The hydroxyl ions (OH⁻) move to the negative electrode catalyst layer side by passing through the anion exchange membrane 21, and reacts with the hydrogen gas to generate water. 60% of the hydrogen gas and the oxygen gas sent to the alkaline fuel cell contributed to the reaction to obtain electric energy and water. The hydrogen gas and oxygen gas which did not contribute to the reaction were released to outside.

The reaction formulae in the alkaline fuel cell are as follows.

Whole 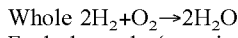$2H_2+O_2 \rightarrow 2H_2O$

Fuel electrode (negative electrode) 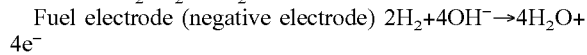$2H_2+4OH^- \rightarrow 4H_2O+4e^-$ Oxygen electrode (positive electrode) 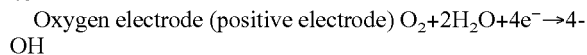$O_2+2H_2O+4e^- \rightarrow 4OH^-$ As a positive electrode material and a negative electrode material, an electrode material with a platinum catalyst or a ruthenium-platinum alloy catalyst carried on a carbon black carrier was used.

The obtained electric energy was sent to the alkaline water electrolytic device, and used as an electric power source thereof. The water was sent to the alkaline water electrolytic device as supplementary water for the alkaline water electrolytic device.

Thermodynamically, 60% of the introduced gas was recovered as electric energy.

Example 2

Except that the raw water used in Example 1 was replaced by pure water, just the same procedure as in Example 1 was carried out to obtain the same results as in Example 1.

Example 3

As illustrated in FIG. 4, 2nd, 3rd and 4th alkaline water electrolytic devices and 2nd and 3rd alkaline fuel cells were connected to the alkaline water electrolytic device 1 and the alkaline fuel cell 2 in a cascade mode, respectively.

180 L of the simulated water used in Example 1 is used as raw water (contaminated water), and the electrolytic solution (alkali concentration of 20% by mass) formed of the contaminated water and the alkaline aqueous solution is used. First, the alkaline water electrolytic device is started by external electric power, and the hydrogen gas and oxygen gas obtained by the alkaline electrolysis are sent to the alkaline fuel cell. Electric energy and water are collected by the alkaline fuel cell. Electrolysis is continued using the obtained electric energy, the obtained water is used as supplementary water for the alkaline water electrolytic device, alkaline water electrolysis is continued, and the contaminated water is concentrated. The concentrated contaminated water is sent to the second alkaline electrolytic device. Electric energy and water are collected by the second fuel cell in the same manner as described above, and second alkaline water electrolysis is continued.

Electrolysis is continued by the third and fourth alkaline water electrolytic devices in the same manner, so that the concentrated contaminated water is further concentrated.

As a result, by the electrolytic treatment using the alkaline water electrolytic device, the contaminated water was concentrated to 3.2 times in one cascade treatment, and concentrated to not less than 100 times as high as the concentration in the raw water by performing a fourth-stage cascade treatment. The use of the heavy water concentration function and generated electric power of the fuel cell made it possible to concentrate contaminated water and considerably reduce treatment energy.

INDUSTRIAL APPLICABILITY

According to the present invention, an alkaline water electrolytic device and an alkaline fuel cell (AFC) are combined with each other, whereby each of electric power required in the alkaline water electrolytic device and the alkaline fuel cell, a hydrogen gas and an oxygen gas serving as raw materials for the electric power, an electrolytic solution formed of the alkaline aqueous solution, and an amount of water corresponding to raw water lost through the electrolytic treatment is circulated and used in the water treatment system. Thereby, raw material components and intermediate products are all effectively used, so that the alkaline water electrolytic device and the alkaline fuel cell can be efficiently operated. Thus, electric power costs can be considerably reduced, and the oxygen gas generated by alkaline water electrolysis is a high-purity oxygen gas, so that the problem of degradation of the electrolytic solution does not occur. Since the electrolyte is an aqueous solution, the equipment is inexpensive, and the water treatment system can be applied to a wide range of use purposes.

REFERENCE SIGNS LIST

1: Alkaline water electrolytic device
2: Alkaline fuel cell
3: Electrolytic solution
4: Raw water
5: Water
6: Oxygen gas
7: Hydrogen gas
9: Electric power energy
10: Water
11: Raw water storage tank
12: Raw water treatment bath
13: Alkaline water electrolytic bath
14: Circulation tank
15: Anode chamber
16: Cathode chamber
17: Diaphragm
18: Pump
19: Electrolytic solution circulation pipe
20: Separator
21: Anion exchange membrane
22: Positive electrode catalyst layer
23: Gas diffusion layer
24: Negative electrode catalyst layer
25: Gas diffusion layer
26: Channel for oxygen gas
27: Channel for hydrogen gas

The invention claimed is:

1. A water treatment system using an alkaline water electrolytic device and an alkaline fuel cell, configured to have following features,
   (1) the alkaline water electrolytic device and the alkaline fuel cell are connected to each other,
   (2) an electrolytic solution obtained by mixing raw water, which is water to be treated by the alkaline water electrolytic device, and an alkaline aqueous solution so as to form a mixture and adjusting the mixture to have a desired alkali concentration, an amount of water corresponding to an amount of the raw water lost through an electrolytic treatment are fed to the alkaline water electrolytic device, and the electrolytic treatment is performed continuously while an alkali concentration is maintained at the initial desired concentration, and the electrolytic solution is circulated, a volume of the raw water is reduced, an oxygen gas is generated from an anode chamber of the alkaline water electrolytic device, and a hydrogen gas is generated from a cathode chamber of the alkaline water electrolytic device,
   (3) the electrolytic solution formed of the alkaline aqueous solution adjusted to have the desired alkali concentration, the oxygen gas and the hydrogen gas generated by the alkaline water electrolytic device are fed to the alkaline fuel cell, at least part of the oxygen gas and the hydrogen gas is used to generate electric power by the alkaline fuel cell, and electric energy and water are collected, and
   (4) the collected electric energy is fed to the alkaline water electrolytic device as an electric power source thereof, part or all of the collected water is fed to a circulation line of the electrolytic solution in the alkaline water electrolytic device, and the electrolytic treatment is continued,
   whereby most or part of electric power energy required in each of the alkaline water electrolytic device and the alkaline fuel cell, the hydrogen gas and the oxygen gas serving as raw materials for generating the electric power energy, and the amount of the water corresponding to the raw water lost through the electrolytic treatment is recycled in the water treatment system.

2. The water treatment system using an alkaline water electrolytic device and an alkaline fuel cell according to claim 1,
   wherein 2nd, 3rd, . . . and nth alkaline water electrolytic devices and 2nd, 3rd, . . . and nth alkaline fuel cells are connected to the alkaline water electrolytic device and the alkaline fuel cell in a cascade mode,
   an electrolytic solution electrolytically treated and concentrated by the alkaline water electrolytic device is sequentially fed to the 2nd, 3rd, . . . and nth alkaline water electrolytic devices, an electrolytic treatment is performed in the same manner as in the electrolytic treatment using the alkaline water electrolytic device, an oxygen gas and a hydrogen gas generated are fed to at least one of the alkaline fuel cell and the 2nd, 3rd, . . . and nth alkaline fuel cells, at least part of the oxygen gas and hydrogen gas is used to generate electric power by the at least one of the alkaline fuel cell and the 2nd, 3rd, . . . and nth alkaline fuel cells, electric energy is collected, and water is generated, the collected electric energy is fed to at least one of the alkaline water electrolytic device and the 2nd, 3rd, . . . and nth alkaline water electrolytic devices, and the electrolytic treatment is continued, water generated in the electric power generation by the at least one of the alkaline fuel cell and the 2nd, 3rd, . . . and nth alkaline fuel cells is discarded or fed to a circulation line of the electrolytic solution in at least one of the alkaline water electrolytic device and the 2nd, 3rd, . . . and nth alkaline water electrolytic devices, and the volume of the raw water subjected to volume reduction by the alkaline water electrolytic device is further reduced by the 2nd, 3rd, . . . and nth alkaline water electrolytic devices.

3. The water treatment system using an alkaline water electrolytic device and an alkaline fuel cell according to claim 1, wherein pure water is used as the raw water.

4. The water treatment system using an alkaline water electrolytic device and an alkaline fuel cell according to claim 1, wherein raw water containing tritiated water is used as the raw water.

5. The water treatment system using an alkaline water electrolytic device and an alkaline fuel cell according to claim 1, wherein raw water containing tritiated water containing impurities including chloride ions is used as the raw water.

6. The water treatment system using an alkaline water electrolytic device and an alkaline fuel cell according to claim 2, wherein each of the alkaline water electrolytic device and the 2nd, 3rd, . . . and nth alkaline water electrolytic devices comprises:
an anode;
a cathode; and
a diaphragm, and each of the anode and the cathode comprises an electrode formed of a Ni or iron base material, or an electrode obtained by subjecting a surface of the base material to Raney nickel coating, Ni-based dispersion plating, or noble metal-based pyrolytic coating.

7. The water treatment system using an alkaline water electrolytic device and an alkaline fuel cell according to claim 2, wherein each of the alkaline fuel cell and the 2nd, 3rd, . . . and nth alkaline fuel cells comprises:
a positive electrode;
a negative electrode; and
an anion exchange membrane, and each of the positive electrode and the negative electrode is formed of an electrode material with a platinum catalyst or a ruthenium-platinum alloy catalyst carried on a carbon black carrier.

8. The water treatment system using an alkaline water electrolytic device and an alkaline fuel cell according to claim 1, wherein raw water containing tritiated water that contains impurities including chloride ions is used as the raw water, distilling of the raw water for removing the impurities is performed prior to the electrolytic treatment by the alkaline water electrolytic device, and in the distilling, the raw water containing the impurities including chloride ions, which is supplied as a salt slurry, is distilled, and the raw water containing tritiated water after the impurities are removed is supplied to the alkaline water electrolytic device.

9. The water treatment system using an alkaline water electrolytic device and an alkaline fuel cell according to claim 8, wherein in the distilling, the salt slurry is concentrated, and a solid is separated and collected.

10. The water treatment system using an alkaline water electrolytic device and an alkaline fuel cell according to claim 2, wherein the electrolytic solution, which is used for the electrolytic treatment by the alkaline water electrolytic device and the 2nd, 3rd, . . . and nth alkaline water electrolytic devices and used in the alkaline fuel cell and the 2nd, 3rd, . . . and nth alkaline fuel cells, comprises the alkaline aqueous solution in an amount from 5 to 60 mass %.

* * * * *